United States Patent
Enomoto et al.

(10) Patent No.: US 6,753,681 B2
(45) Date of Patent: Jun. 22, 2004

(54) ANGLE SENSOR

(75) Inventors: Etsuko Enomoto, Aichi-ken (JP); Yukihiro Kato, Aichi-ken (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 10/125,362

(22) Filed: Apr. 19, 2002

(65) Prior Publication Data

US 2003/0052669 A1 Mar. 20, 2003

(30) Foreign Application Priority Data

Apr. 19, 2001 (JP) .......................................... 2001-121348

(51) Int. Cl.⁷ ................................................. G01B 7/30
(52) U.S. Cl. ............................ 324/207.25; 324/207.2; 324/207.21
(58) Field of Search ....................... 324/207.14–207.25; 338/32 H, 32 R

(56) References Cited

U.S. PATENT DOCUMENTS

| | | | | |
|---|---|---|---|---|
| 4,392,375 A | * | 7/1983 | Eguchi et al. ............... | 73/118.1 |
| 4,857,841 A | * | 8/1989 | Hastings et al. ........ | 324/207.21 |
| 5,148,106 A | * | 9/1992 | Ozawa ................... | 324/207.21 |
| 5,252,919 A | * | 10/1993 | Uemura ................ | 324/207.25 |
| 5,544,000 A | | 8/1996 | Suzuki et al. | |
| 6,476,600 B2 | * | 11/2002 | Kono et al. .............. | 324/207.2 |
| 2002/0152821 A1 | | 10/2002 | Strothmann | |

FOREIGN PATENT DOCUMENTS

| | | |
|---|---|---|
| DE | 33 12 626 A1 | 10/1984 |
| DE | 43 17 259 A1 | 11/1993 |
| DE | 197 02 567.6 | 3/1998 |
| DE | 199 64 884 A1 | 7/2001 |
| DE | 100 39 216 A1 | 2/2002 |
| JP | 61 218 120 A | 9/1986 |
| JP | 2 273 904 A | 11/1990 |
| JP | 3 273 603 A | 12/1991 |

OTHER PUBLICATIONS

Japanese Patent Application Laid–Open Publications No. 61–75213, Apr. 17, 1986.
Japanese Patent Application Laid–Open Publications No. 62–291502, Dec. 18, 1987.

* cited by examiner

Primary Examiner—N. Le
Assistant Examiner—Reena Aurora
(74) Attorney, Agent, or Firm—Sughrue Mion, PLLC

(57) ABSTRACT

To provide an angle sensor which can equalize the magnetic flux distribution while using inexpensive magnets manufactured easily and which can reduce the detection error even if the relative position between the magnetoelectric conversion element and the magnet changes. The permanent magnets M1a, M1b, M2a, M2b each of which is rectangular solid are fixed to the yoke 13 of the rotational angle displacement sensor 11. The permanent magnets M1a, M1b are separated from each other with a clearance L. The permanent magnets M1a, M1b are magnetized in such a manner that the side fixed to the flat wall portion 15a of the yoke 13 is N pole and that the side opposing to the fixed surface side is S pole. Further, the permanent magnets M2a, M2b are separated from each other with a clearance L. The permanent magnets M2a, M2b are magnetized in such a manner that the side fixed to the flat wall portion 15b of the yoke 13 is S pole and that the side opposing to the fixed surface side is N pole.

1 Claim, 10 Drawing Sheets

ANGLE SENSOR

BACKGROUND OF THE INVENTION

This invention relates to an angle sensor. For more detail, the invention relates to an angle sensor using a magneto-electric conversion element.

PRIOR ART

Up to now, a rotational angle displacement sensor which uses a Hall effect as a detecting element is known as an angle sensor for detecting a rotational angle (for example, Japanese Patent Application Laid-Open Publications No. 61-75213 and No. 62-291502). The rotational angle displacement sensor of this kind excels in that a rotational angle can be detected in non-contact condition.

FIGS. 21 and 22 show a plan view and a cross sectional view of a prior rotational angle displacement sensor for detecting a rotational angle displacement of a rotational axis. In FIG. 22, a rotational angle displacement sensor 51 includes a rotational axis portion 52 as a rotational member, a yoke 53 and a permanent magnet 54. The rotational axis portion 52 is connected to a detected rotational axis (not shown) in a body and rotates around an axial center (Z axis) with the detected rotational axis.

The yoke 53 is a cylindrical member with a bottom portion which is formed on a top end of the rotational axis portion 52. A central axial line of a cylindrical portion 53a is coincided with the axial center (Z axis) of the rotational axis portion 52. The cylindrical portion 53a rotates around the central axial line (Z axis) in a body with the rotation of the rotational axis portion 52.

The cylindrical permanent magnet 54 is fixed to an inner side surface of the cylindrical portion 53a. A central axial line of the permanent magnet 54 is coincided with the axial center (Z axis) of the rotational axis portion 52. Accordingly, the permanent magnet 54 rotates around the central axial line (Z axis) in a body with the rotation of the rotational axis portion 52.

The cylindrical permanent magnet 54 is magnetized in such a manner that the front side (lower side in FIG. 21) is a N pole and that the rear side (upper side in FIG. 21) is S pole. A magnetic field which forms a magnetic flux heading from the N pole to the S pole is generated in the cylindrical portion of the magnet 54 as shown by broken line arrow. A characteristic curve shown by X mark in FIG. 4 is a diagram which shows the magnetic flux density distribution on a X axis line (right and left direction) in the cylindrical portion of the permanent magnet 54 under the condition shown in FIG. 21. A characteristic curve shown by X mark in FIG. 5 is a diagram which shows the magnetic flux density distribution on a Y axis line (front and rear direction) in the cylindrical portion of the permanent magnet 54 under the condition shown in FIG. 21.

In a space of the cylindrical portion of the permanent magnet 54, a Hall element 55 as a magnetoelectric conversion element is disposed. A center of the Hall element 55 is coincided with the central axial line (Z axis) of the permanent magnet 54 and the Hall element 55 is arranged along the Y axis direction (front and rear direction) under the condition shown in FIG. 21. The direction of magnetism which the Hall element 55 detects is in parallel with the X axis direction in FIG. 21. When the permanent magnet 54 rotates around the central axial line (Z axis), the relative position between the permanent magnet 54 (N, S poles) and the Hall element 55 changes. The Hall element 55 detects this change of the relative position. The Hall element 55 outputs a detect signal corresponding to the variation of the relative position, namely the rotational angle.

PROBLEM THAT THE INVENTION IS TO SOLVE

Meanwhile, in the rotational angle displacement sensor 51, the variation of the relative position between the Hall element 55 and the permanent magnet 54, so called, an axis deviation generates structurally easily by the measuring error of the rotational axis portion 52 and so on, the mounting error of the Hall element 55 and so on or the temperature change or the wear. This axis deviation makes the detection by the Hall element 55 generate an error and the detecting accuracy deteriorates.

Namely, under the condition shown in FIG. 21, the variation of the magnetic flux density distribution in the cylindrical portion of the permanent magnet 54 increases as the distance relative to the magnetic poles of the permanent magnet 54 decreases on the basis of the central axis (Z axis). Especially, the variation of the magnetic flux density distribution in the Y axis direction shown in FIG. 5 is larger than the variation of the magnetic flux density distribution in the X axis direction shown in FIG. 4. For example, in FIG. 5, when the disposed position of the Hall element 55 is shifted from the center, the variation of the magnetic flux density becomes extremely large amount.

Accordingly, when the relative position between the Hall element 55 and the permanent magnet 54 is changed, the variation of the magnetic flux density becomes large and the large variation appears as a detection error. Therefore, it is desired to reduce the variation of the magnetic flux density in the X axis and the Y axis directions as much as possible. Namely, it is desired to equalize the magnetic flux density. Because, in case of that the magnetic flux density is equalized, even if the axis deviation generates, the variation of the magnetic flux density is small and the detection error can be reduced.

Further, in the cylindrical permanent magnet 54, the variation of the magnetic flux density in the Z axis direction is also large. Accordingly, in case of that the relative position in the Z axis direction also changes, similar problems occur. Therefore, it is desirable that the magnetic flux density distribution is also equalized in the Z axis direction. Then, a permanent magnet which equalizes the magnetic flux density distribution is suggested (for example, Japanese Patent Application Laid-Open Publication No. 10-132506).

FIGS. 18 and 19 shows a cross-sectional view of permanent magnets 56, 57 which equalize the magnetic flux density distribution in the Z axis direction. In the permanent magnet 56, a circular groove 56b which constitutes a magnetic flux density distribution correction portion is formed on an inner circumferential surface 56a. Further, in the permanent magnet 57, circular projecting portions 57b which constitute a magnetic flux density distribution correction portion are formed at both end portions of an inner circumferential surface 57a. FIG. 20 shows characteristic curves of the magnetic flux density distribution on the Z axis. The characteristic curve shown by X mark is a characteristic curve of the permanent magnet 54 which none is given on the inner circumferential surface and the characteristic curve shown by ● mark is a characteristic curve of the permanent magnets 56, 57 which the magnetic flux density distribution correction portion is formed on the inner circumferential surface. Namely, the variation of the magnetic flux density distribution on the Z axis of the permanent magnets 56, 57 which the magnetic flux density distribution correction portion is formed is smaller than that of the permanent magnet 54 which the magnetic flux density distribution correction portion is not formed.

In case of the permanent magnets 56, 57 which equalize the magnetic flux density distribution on the Z axis by the correction of the form, however, since the form of the magnets is specific, high technique is required for manufacturing the magnets and therefore the manufacturing cost is increased. Namely, in case of that the permanent magnets 56, 57 are made of sintered magnet, a pressing die is required for pressing the magnet powder and it is difficult to die-cut. Further, it is very difficult to accurize the measure of the magnet after sintering. Further, in case of that the permanent magnets are made of plastic magnet, the forming die is also required and it is also difficult to die-cut. Therefore, it is necessary to cut the inner circumferential surface after the forming of the cylindrical magnet for manufacturing the permanent magnets 56, 57 and the manufacturing cost is increased.

SUMMARY OF THE INVENTION

The present invention is done for overcoming the above problems and an object thereof is to provide an angle sensor which can equalize the magnetic flux distribution while using inexpensive magnets manufactured easily and which can reduce the detection error even if the relative position between the magnetoelectric conversion element and the magnet changes.

The invention provides an angle sensor comprising; a cylindrical magnet fixed to a rotational member and rotating with the rotation of the rotational member; and a magnetoelectric conversion element disposed in magnetic field generated by the magnet and outputting an electric signal corresponding to the magnetic field; wherein a magnetic flux density distribution correction portion is formed on an outer circumferential surface of the magnet.

The invention also provides an angle sensor comprising; a cylindrical magnet fixed to a rotational member and rotating with the rotation of the rotational member; and a magnetoelectric conversion element disposed in magnetic field generated by the magnet and outputting an electric signal corresponding to the magnetic field; wherein a magnetic flux density distribution correction portion is formed on an outer circumferential surface of the magnet.

According to the invention, two magnetic poles of one side are formed by two piece of the magnets and two magnetic poles of the other side are formed by other two piece of the magnets. And, the magnets forming the magnetic poles of one side and the magnets forming the magnetic poles of the other side are separated from each other and are fixed to the inner side surface of the tubular yoke. Thereby, the distribution of the magnetic flux density in the direction that runs at right angle to the rotational central axis of the rotational member in the tubular yoke being adjacent to the magnetoelectric conversion element is uniformed.

According to the invention, since the magnetic flux density distribution correction portion is formed on the outer circumferential surface of the magnet, it is able to uniform the distribution of the magnetic flux density in the direction of the rotational central axis of the rotational member. Further, it is able to die-cut easily at the forming of the cylindrical magnet. Therefore, the manufacturing of the magnet becomes easy and the manufacturing cost can be decreased.

DETAILED DESCRIPTION OF THE INVENTION

Hereinafter, a first embodiment of a rotational angle displacement sensor which concretizes the present invention will be described with reference to FIGS. 1 to 5.

Figure 1:
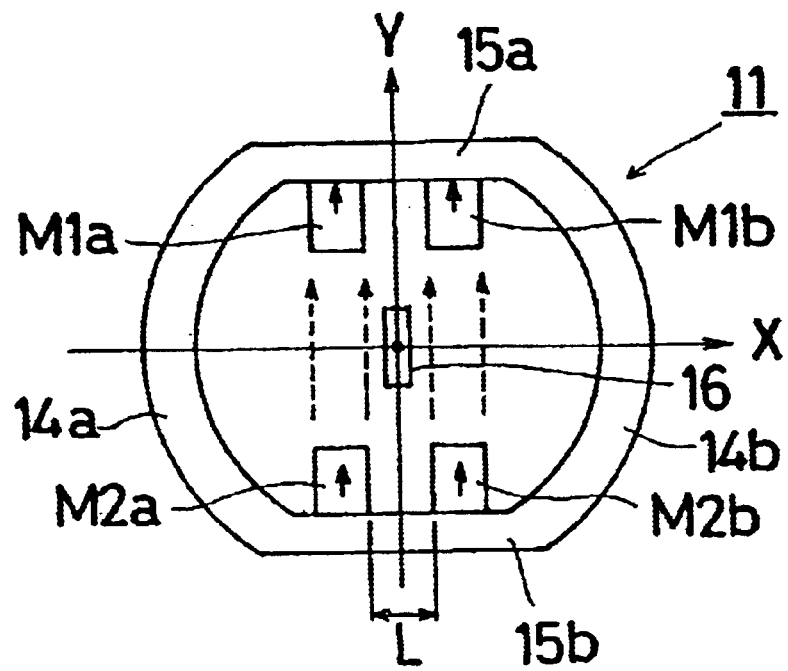
FIG. 1 is a plan view of the rotational angle displacement sensor of the first embodiment.
Figure 2:
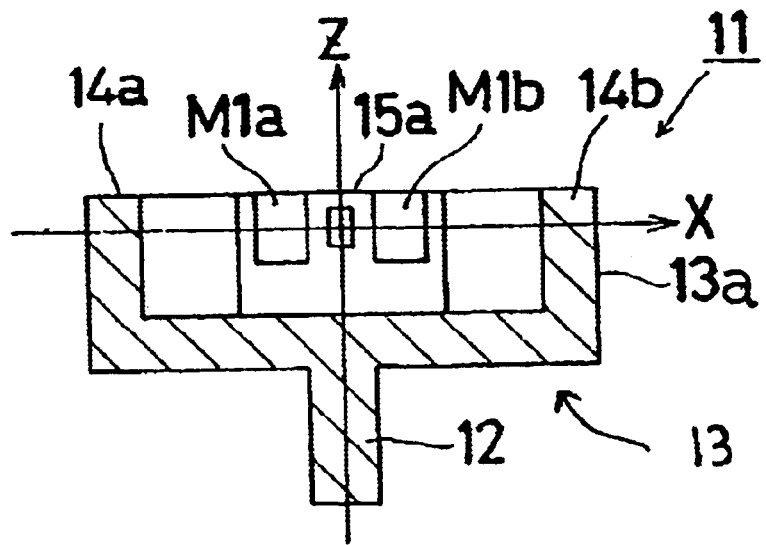
FIG. 2 is a cross sectional view of the rotational angle displacement sensor of the first embodiment.
Figure 3:
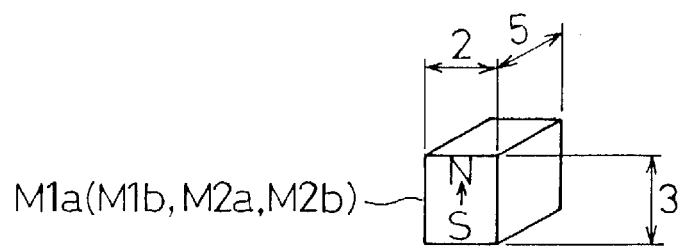
FIG. 3 is a perspective view for explaining the form of the permanent magnet of the first embodiment.

FIGS. 1 and 2 show a plan view and a cross sectional view of the rotational angle displacement sensor for detecting a rotational angle displacement of a rotational axis. In FIG. 2, the rotational angle displacement sensor 11 as an angle sensor includes a rotational axis portion 12 as an rotational member, a yoke 13 made of magnetic material and four permanent magnet M1a, M1b, M2a and M2b. The rotational axis portion 12 is connected to a detected rotational axis (not shown) in a body and rotates around an axial center (Z axis) with the detected rotational axis in a body.

The yoke 13 is an oval shaped tubular member with a bottom portion which is formed on a top end of the rotational axis portion 12. A central axial line of a tubular portion 13a whose cross sectional shape is an oval shape is coincided with the axial center (Z axis) of the rotational axis portion 12. Accordingly, the tubular portion 13a rotates around the central axial line (Z axis) in a body with the rotation of the rotational axis portion 12. The tubular portion 13 includes circular arc portions 14a, 14b which are formed at the right and left side portions and flat wall portions 15a, 15b which are formed at the front and rear side portions in FIG. 1.

A pair of permanent magnets M1a and M1b in the right and left direction are fixed on the inner side surface of the rear side flat portion 15a of the tubular portion 13a. In FIG. 1, the permanent magnets M1a and M1b are symmetrically arranged with respect to the Y axis which runs at right angle to the Z axis and are fixed on the inner side surface of the rear side flat portion 15a. Each of the permanent magnets M1a and M1b is a rectangular prism magnet 2 mm width (magnetized direction), 3 mm thickness and 5 mm height. Each of the permanent magnets M1a and M1b is magnetized in such a manner that the rear side flat portion 15a side is N pole and that the opposite side is S pole.

On the other hand, a pair of permanent magnets M2a and M2b in the right and left direction are fixed on the inner side surface of the front side flat portion 15b of the tubular portion 13a so as to be opposite to the permanent magnets M1a and M1b, respectively. The permanent magnets M2a and M2b are the same magnets as the permanent magnets M1a and M1b. Namely, the form and the strength of magnetic force are the same.

Accordingly, the permanent magnets M1a, M1b, M2a and M2b are arranged symmetrically around the intersection of the X axis, the Y axis and the Z axis which intersect at right angles each other. Therefore, when the rotational axis portion 12 rotates, the permanent magnets M1a, M1b, M2a and M2b rotate around the Z axis. Further, a clearance L between the permanent magnets M2a and M2b is the same as a clearance between the permanent magnets M1a and M1b. Further, a clearance between the permanent magnets M2a and M1a which are opposite each other is the same as a clearance between the permanent magnets M2b and M1b and is 9 mm in this embodiment.

Further, each of the permanent magnets M2a and M2b is magnetized in such a manner that the front side flat portion 15b side is S pole and that the opposite side is N pole. Accordingly, a magnetic field which forms a magnetic flux heading from the permanent magnets M2a and M2b to the permanent magnets M1a and M1b is generated in the tubular portion 13 as shown by broken line arrow.

In a space of the tubular portion 13a, a Hall element 16 as a magnetoelectric conversion element is disposed. A center of the Hall element 16 is coincided with an axial line (Z axis) passing a symmetrical point center of the permanent magnets M1a, M1b, M2a and M2b and the Hall element 16 is arranged along the Y axis direction under the condition shown in FIG. 1. The direction of magnetism which the Hall element 16 detects is in parallel with the X axis direction in FIG. 1.

When the permanent magnets M1a, M1b, M2a and M2b rotate around the central axial line (Z axis), the relative position between each of the permanent magnets M1a, M1b, M2a and M2b and the Hall element 16 changes. The Hall element 16 detects this change of the relative position. The Hall element 16 outputs a detect signal corresponding to the variation of the relative position, namely the rotational angle.

At this time, the magnetic flux density distribution formed in the space in the tubular portion 13a equalizes by the permanent magnets M1a, M1b, M2a and M2b. Namely, the permanent magnets M1a, M1b, M2a and M2b separate from each other with the clearance L. Accordingly, since the permanent magnets M1a, M1b, M2a and M2b are a rectangular prism respectively and separate from each other, the magnetic flux heading from the permanent magnets M2a and M2b to the permanent magnets M1a and M1b does not concentrate at the central portion in the tubular portion 13a (near the Hall element 16) and is dispersed uniformly. As a result, the magnetic flux density distribution formed in the space in the tubular portion 13a is equalized.

Figure 4:
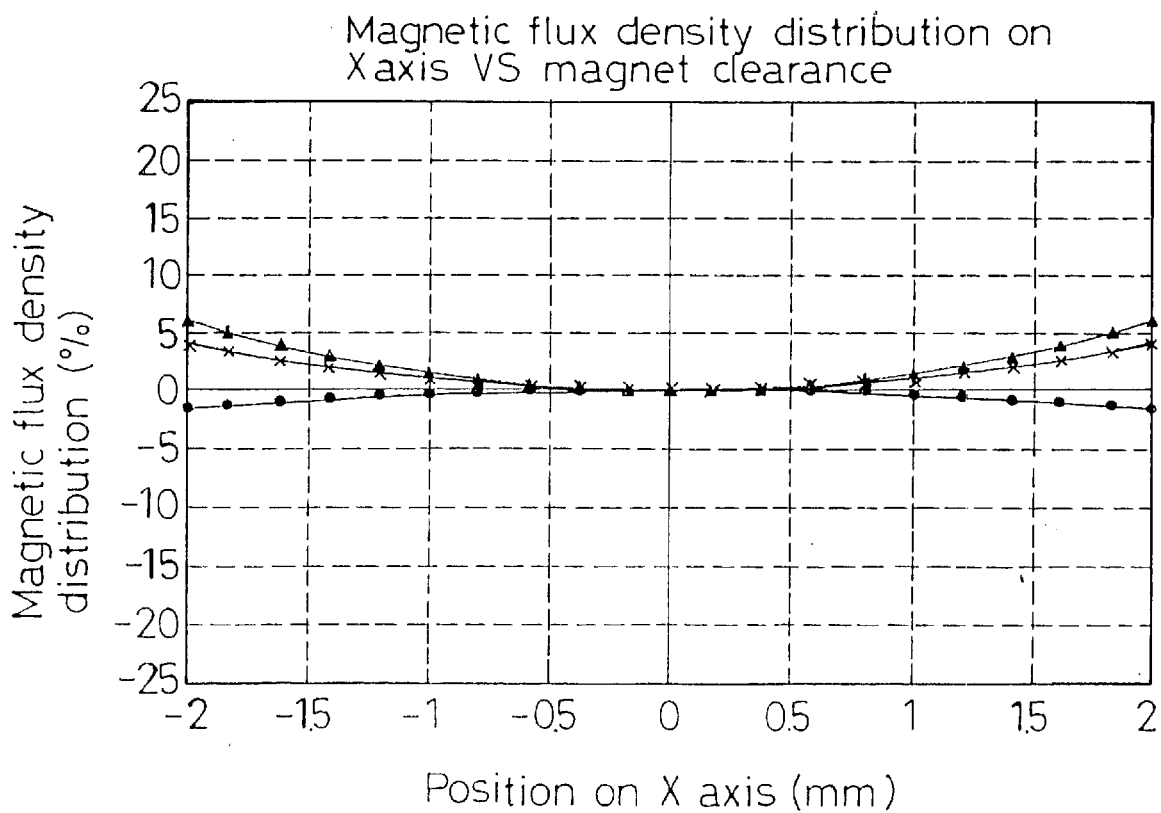
FIG. 4 is a graph showing characteristic curves of the magnetic flux density distribution on the X axis obtained by simulation of the magnetic flux density distribution formed in the cylindrical portion of the first embodiment.
Figure 5:
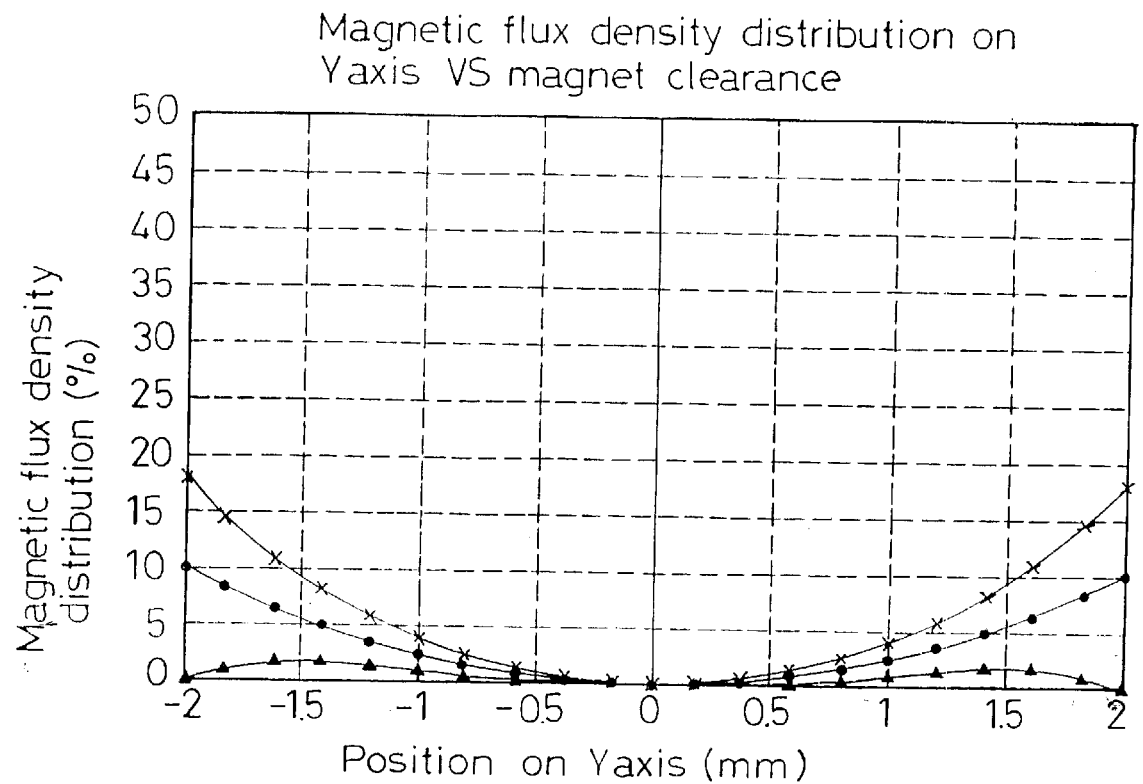
FIG. 5 is a graph showing characteristic curves of the magnetic flux density distribution on the Y axis obtained by simulation of the magnetic flux density distribution formed in the cylindrical portion of the first embodiment.

FIGS. 4 and 5 shows characteristic curves of the magnetic flux density distribution on the X axis and the Y axis which are obtained by the inspection based on the simulation of the magnetic flux density distribution formed in the tubular portion 13a by the permanent magnets M1a, M1b, M2a and M2b. The characteristic curve shown by X mark is a characteristic curve of the prior cylindrical permanent magnet 54. The characteristic curve shown by ● mark is a characteristic curve of the permanent magnets M1a, M1b, M2a and M2b which are separated from each other with the clearance L of 3 mm. The characteristic curve shown by ▲ mark is a characteristic curve of the permanent magnets M1a, M1b, M2a and M2b which are separated from each other with the clearance L of 4 mm. In FIGS. 4 and 5, the 0 point of the horizontal axis shows the rotational center (Z axis) and the vertical axis shows the increasing and decreasing of the magnetic flux density on percentage with reference to the magnetic flux density on the rotational center (Z axis).

As evidenced by each characteristic curves, in case of that the clearance L is 3 mm, the magnetic flux density distribution on the Y axis line and the X axis line is uniformed in comparison with the prior art. Further, in case of that the clearance L is 4 mm, the magnetic flux density distribution on the Y axis line is further uniformed in comparison with the case of the clearance L of 3 mm. In case of that the clearance L is 4 mm, the magnetic flux density distribution on the X axis line falls below slightly in comparison with the prior art.

Accordingly, when the permanent magnets M1a, M1b, M2a and M2b are disposed within the range of 3 mm to 4 mm of the clearance L, the magnetic flux density distribution on the Y axis line and the X axis line can be uniformed.

As mentioned above, according to the first embodiment, the following effects are obtained.

(1) Since a pair of rectangular prism permanent magnets M1a and M1b in the right and left direction and a pair of rectangular prism permanent magnets M2a and M2b in the right and left direction are fixed on the rear side flat wall portion 15a and the front side flat wall portion 15b which are opposite each other while separating from each other, the magnetic flux density distribution on the X axis line and the Y axis line in the tubular portion 13 in which the Hall element 16 is disposed can be uniformed in comparison with the prior cylindrical permanent magnet 54.

Accordingly, even if the variation of the relative position between the Hall element 16 and the permanent magnets M1a, M1b, M2a and M2b, so called, an axis deviation on the X axis line or the Y axis line generates by the measuring error of the rotational axis portion 12 and so on, the mounting error of the Hall element 16 with respect to the permanent magnets M1a, M1b, M2a and M2b or the temperature change or the wear, it is able to reduce the detection error of the Hall element 16.

(2) The form of the permanent magnets M1a, M2a, M2a and M2b which are fixed to the rear side flat wall portion 15a and the front side flat wall portion 15b is rectangular prism or solid. Accordingly, it is able to manufacture the permanent magnet inexpensively and easily without requiring the high technique and therefore it is able to provide an inexpensive rotational angle displacement sensor 11.

Next, a second embodiment which concretizes the present invention will be described with reference to FIGS. 6 to 9. This embodiment is characterized by arrangement of the permanent magnet. In FIGS. 6 to 9, the other structures are the same as the structures of the prior rotational angle displacement sensor 51 shown in FIG. 21 and FIG. 22 and the same structures as compared with the prior rotational angle displacement sensor 51 are identified by the same reference numerals, and the descriptions of the same structures are partly omitted.

Figure 6:
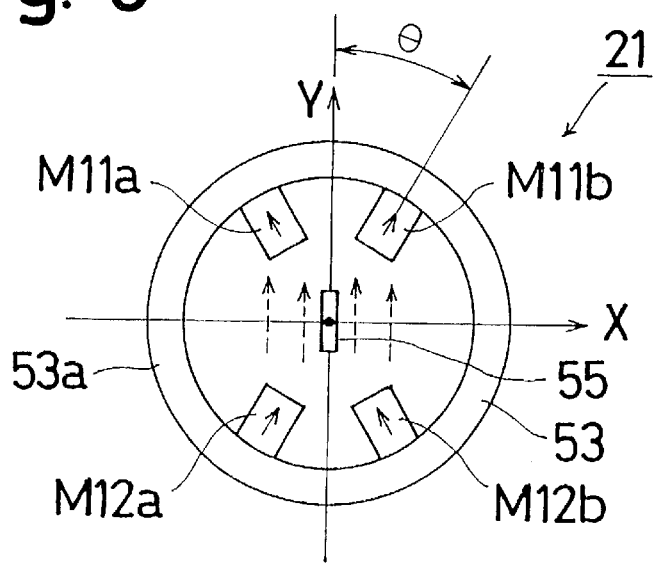
FIG. 6 is a plan view of the rotational angle displacement sensor of the second embodiment.

FIG. 6 shows a plan view of a rotational angle displacement sensor 21 as an angle sensor of this embodiment. Four permanent magnets M11a, M11b, M12a and M12b are radially disposed in the cylindrical portion 53a of the yoke 53 of the rotational angle displacement sensor 21 and are fixed to the inner side surface of the cylindrical portion 53a. The width, thickness and height of each of the permanent magnets M11a, M11b, M12a and M12b are the same as the first embodiment. In FIG. 6, the first and second permanent magnets M11a and M11b are disposed in the cylindrical portion 53a symmetrically with respective to the Y axis line which intersects with the Z axis at right angles. The first and second permanent magnets M11a and M11b are fixed on a rear portion inner side surface of the cylindrical portion 53a and are separated from each other with an angle 2θ Each of first and second permanent magnet M11a and M11b is a magnet whose form is rectangular prism or solid. The first and second permanent magnets M11a and M11b are magnetized in such a manner that the side fixed to the yoke 53 (the fixed surface side) is N pole and that the side opposing to the fixed surface side is S pole.

On the other hand, In FIG. 6, the third and fourth permanent magnets M12a and M12b are disposed in the cylindrical portion 53a symmetrically with respective to the Y axis line which intersects with the Z axis at right angles. The third and fourth permanent magnets M12a and M12b are fixed on the rear portion inner side surface of the cylindrical portion 53a and are separated from each other with an angle 2θ. Each of the third and fourth permanent magnet M12a and M12b is a magnet whose form is rectangular prism or solid.

The third and fourth permanent magnets M12a and M12b are the same magnets as the first and second permanent magnets M11a and M11b. Namely, the form and the strength of magnetic force are the same. Accordingly, the permanent magnets M11a, M11b, M12a and M12b are arranged symmetrically around the intersection of the X axis, the Y axis and the Z axis which intersect at right angles each other as shown in FIG. 6. Further, a clearance between the first permanent magnet M11a and the fourth permanent magnet M12b is the same as a clearance between the second permanent magnet M11b and the third permanent magnet M12a. In this embodiment, this clearance is set to 9 mm. Thus, when the rotational axis portion 12 rotates, the permanent magnets M11a, M11b, M12a and M12b rotate around the Z axis.

In this embodiment, the form of each of the permanent magnets M11a, M11b, M12a and M12b is rectangular prism or solid. However, the form of fixed surface side of each of the permanent magnets M11a, M11b, M12a and M12b may be arc surface which is along the inner circumferential surface of the yoke 53. In this case, it is able to closely contact the yoke 53 with the permanent magnets M11a, M11b, M12a and M12b.

Further, the third and fourth permanent magnets M12a and M12b are magnetized in such a manner that the side fixed to the yoke 53 (the fixed surface side) is S pole and that the side opposing to the fixed surface side is N pole. Accordingly, a magnetic flux heading from the third and fourth permanent magnets M12a and M12b to the first and second permanent magnets M11a and M11b is formed in the cylindrical portion 53a as shown by broken line arrow.

In a space of the cylindrical portion 53a, the Hall element 55 as a magnetoelectric conversion element is disposed. A center of the Hall element 55 is coincided with an axial line (Z axis) passing a symmetrical point center of the permanent magnets M11a, M11b, M12a and M12b and the Hall element 55 is arranged along the Y axis direction under the condition shown in FIG. 6. The direction of magnetism which the Hall element 55 detects is in parallel with the X axis direction in FIG. 6.

When the permanent magnets M11a, M11b, M12a and M12b rotate around the central axial line (Z axis), the relative position between each of the permanent magnets M11a, M11b, M12a and M12b and the Hall element 55 changes. The Hall element 55 detects this change of the relative position. The Hall element 55 outputs a detect signal corresponding to the variation of the relative position, namely the rotational angle.

At this time, the magnetic flux density distribution formed in the space in the cylindrical portion 53a equalizes by the permanent magnets M11a, M11b, M12a and M12b. Namely, the permanent magnets M11a and M11b and the permanent magnet M12a and M12b separate from each other with the angle 2θ. Accordingly, since the permanent magnets M11a, M11b, M12a and M12b are a rectangular prism respectively and separate from each other, the magnetic flux heading from the third and fourth permanent magnets M12a and M12b to the first and second permanent magnets M11a and M11b does not concentrate at the central portion in the cylindrical portion 53a (near the Hall element 55) and is dispersed uniformly. As a result, the magnetic flux density distribution formed in the space in the cylindrical portion 53a is equalized.

Figure 7:
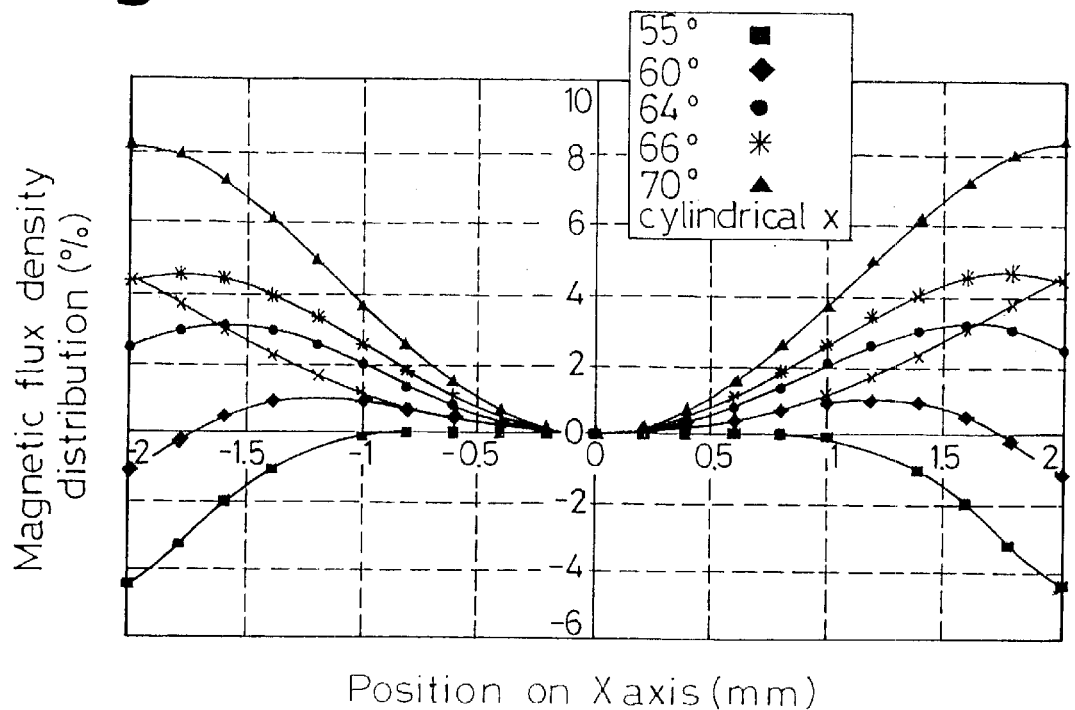
FIG. 7 is a graph showing characteristic curves of the magnetic flux density distribution on the X axis obtained by simulation of the magnetic flux density distribution formed in the cylindrical portion of the second embodiment.
Figure 8:
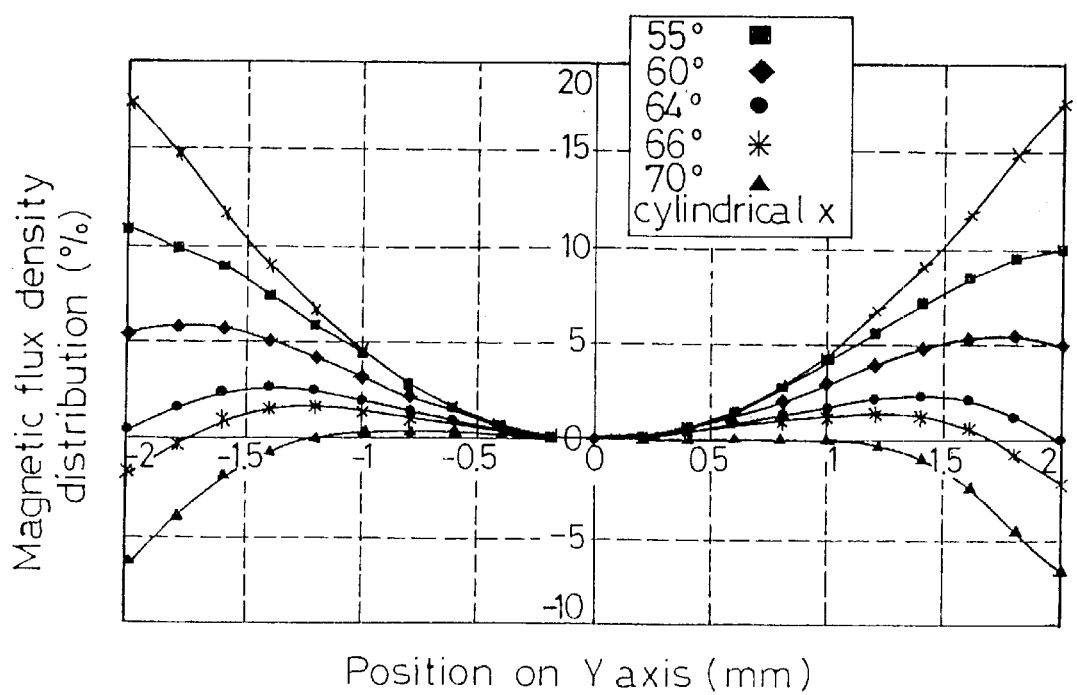
FIG. 8 is a graph showing characteristic curves of the magnetic flux density distribution on the Y axis obtained by simulation of the magnetic flux density distribution formed in the cylindrical portion of the second embodiment.

FIGS. 7 and 8 shows characteristic curves of the magnetic flux density distribution on the X axis and the Y axis which are obtained by the inspection based on the simulation of the magnetic flux density distribution formed in the cylindrical portion 53a by the permanent magnets M11a, M11b, M12a and M12b. The characteristic curve shown by X mark is a characteristic curve of the prior cylindrical permanent magnet 54. The characteristic curve shown by ■ mark is a characteristic curve of the permanent magnets M11a, M11b, M12a and M12b which the separating angle 2 θ is 55 degree. The characteristic curve shown by ♦ mark is a characteristic curve of the permanent magnets M11a, M11b, M12a and M12b which the separating angle 2 θ 60 degree. The characteristic curve shown by ● mark is a characteristic curve of the permanent magnets M11a, M11b, M12a and M12b which the separating angle 2 θ 64 degree. The characteristic curve shown by * mark is a characteristic curve of the permanent magnets M11a, M11b, M12a and M12b which the separating angle 2 θ66 degree. The characteristic curve shown by ♦ mark is a characteristic curve of the permanent magnets M11a, M11b, M12a and M12b which the separating angle 2 θ 70 degree. In FIGS. 7 and 8, the 0 point of the horizontal axis shows the rotational center (Z axis) and the vertical axis shows the increasing and decreasing of the magnetic flux density on percentage with reference to the magnetic flux density on the rotational center (Z axis).

As evidenced by each characteristic curves, in case of that the separating angle 2 θ 60 to 70 degree, the magnetic flux density distribution on the X axis line is superior (the region in which the magnetic flux density is uniform is broad). Further, in case of that the separating angle 2 θ 60 to 70 degree, the magnetic flux density distribution on the X axis line falls below slightly in comparison with the prior art, but the magnetic flux density distribution on the Y axis line is substantially superior in comparison with the prior art.

There is possibility that the deviation of the position of the Hall element 55 generates in the X axis direction and Y axis direction. Therefore, if the magnetic flux density distribution is superior, namely the region in which the magnetic flux density is uniform is broad, this means that the detection error generated by the deviation of the position of the Hall element 55 can be reduced. Accordingly, it is preferable that the separating angle 2 θ 60 to 70 degree.

Figure 9:
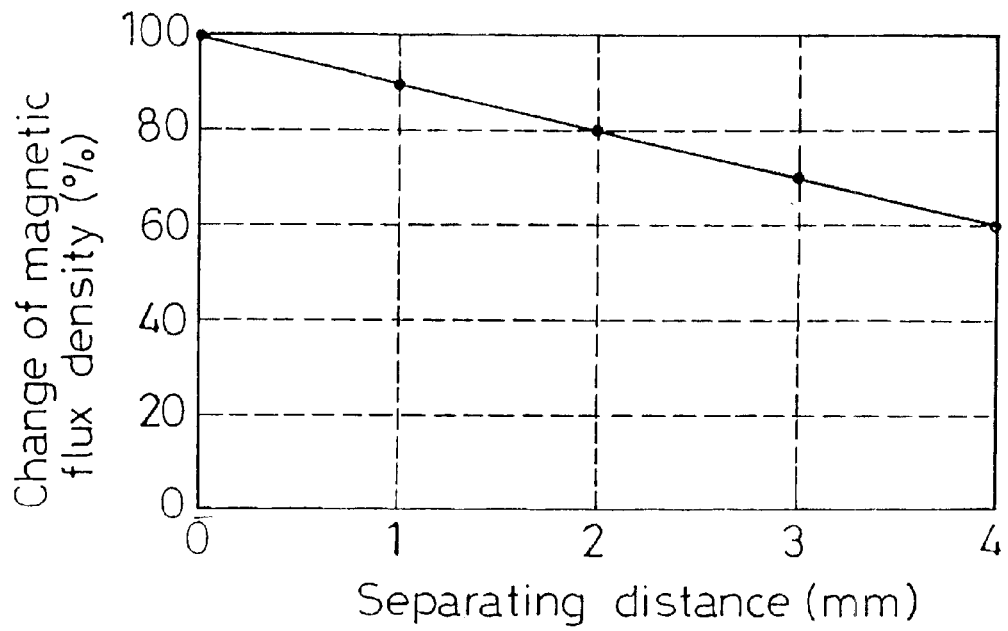
FIG. 9 is a graph showing a relationship between the separating distance of the permanent magnet and the magnetic flux near the Hall element in the first embodiment.

Further, in comparison with the first embodiment, according to the second embodiment, the permanent magnets M11a, M11b, M12a and M12b are disposed radially toward the center of the Hall element 55 (Z axis) in order to uniform the distribution of the magnetic flux density as shown in FIG. 6. On the other hand, in the first embodiment, as shown in FIG. 1, the permanent magnets M1a and M1b are disposed so as to be separated from each other with the predetermined clearance. Further, the permanent magnets M2a and M2b are disposed so as to be separated from each other with the predetermined clearance. FIG. 9 is a graph inspected by simulation and shows a relationship between the magnetic flux density adjacent to the Hall element 16 and the separating distance (clearance) of the permanent magnets M1a and M1b (M2a and M2b) in the first embodiment. As shown in FIG. 9, in case of that the permanent magnets M1a and M1b (M2a and M2b) are separated, in comparison with a case which the permanent magnets M1a and M1b (M2a and M2b) are not separated, the magnetic flux density distribution adjacent to the Hall element 16 is decreased. Therefore, in the first embodiment, the output of the Hall element 16 is decreased by the decrease of the magnetic flux density.

Figure 10:
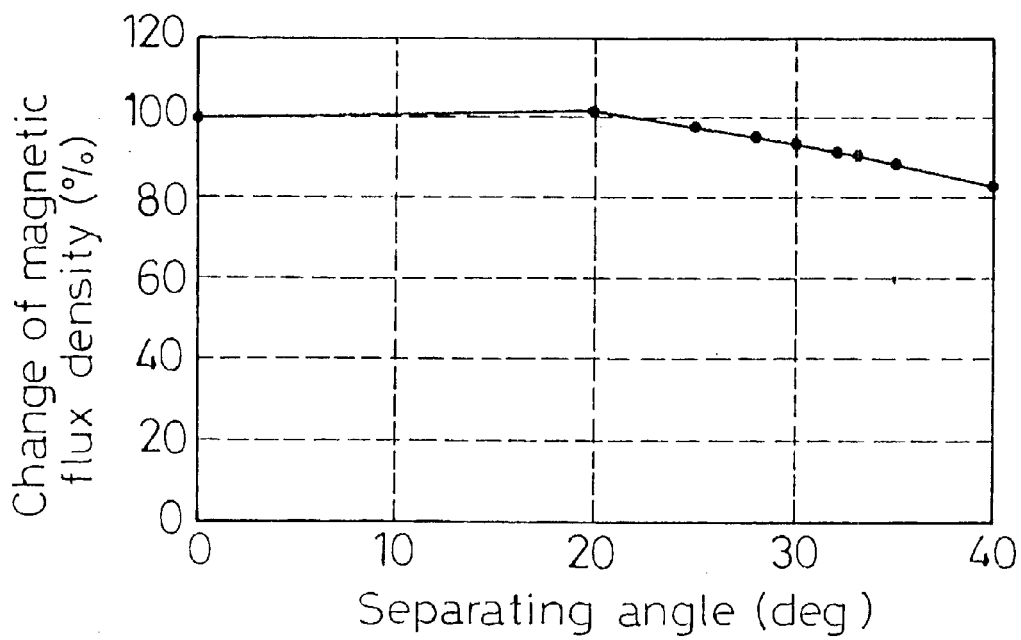
FIG. 10 is a graph showing a relationship between the separating angle of the permanent magnet and the magnetic flux near the Hall element in the second embodiment.

On the contrary, according to the inspection by simulation based on the structures of the second embodiment, as shown in FIG. 10, even though the separating angle between the permanent magnets M11a and M11b (M12a and M12b) is increased, the decrease of the magnetic flux density is small in comparison with the first embodiment. Thereby, in comparison with the first embodiment, it is able to reduce the size of the permanent magnet for obtaining the same output value by the Hall element 55. Thus, it is able to miniaturize the sensor and it is able to reduce the manufacturing cost. Further, as mentioned above, it is able to uniform the magnetic flux density distribution at the central portion in the cylindrical portion 53a (near the Hall element 55) as shown in FIGS. 7 and 8.

As mentioned above, according to the second embodiment, the following effects are obtained.

(1) In this embodiment, the permanent magnets M11a and M11b (M12a and M12b) which are rectangular prism are separated from each other with the angle 2 θ and are fixed to the cylindrical portion 53a.

Accordingly, the magnetic flux density distribution on the X axis line and the Y axis line (and the Z axis line) in the cylindrical portion 53a in which the Hall element 55 is disposed can be uniformed. Therefore, even if the variation of the relative position between the Hall element 55 and the permanent magnets M11a, M11b, M12a and M12b, so called, an axis deviation on the X axis line and the Y axis line generates by the measuring error of the rotational axis portion 12 and so on, the mounting error of the Hall element 55 with respect to the permanent magnets M11a, M11b, M12a and M12b or the temperature change or the wear, it is able to reduce the detection error of the Hall element 55.

(2) In this embodiment, the form of each of the first, second, third and fourth permanent magnets M11a, M11b, M12a and M12b is rectangular prism. Accordingly, it is able to manufacture the permanent magnet inexpensively and easily without requiring the high technique and therefore it is able to provide an inexpensive rotational angle displacement sensor 21.

(3) In this embodiment, it is able to ensure the magnetic flux at the central portion in the cylindrical portion 53a (near the Hall element 55) without increasing the size of each of the permanent magnets M11a, M11b, M12a and M12b. Accordingly, it is able to reduce the cost of each of the permanent magnets M11a, M11b, M12a and M12b.

Figure 11:
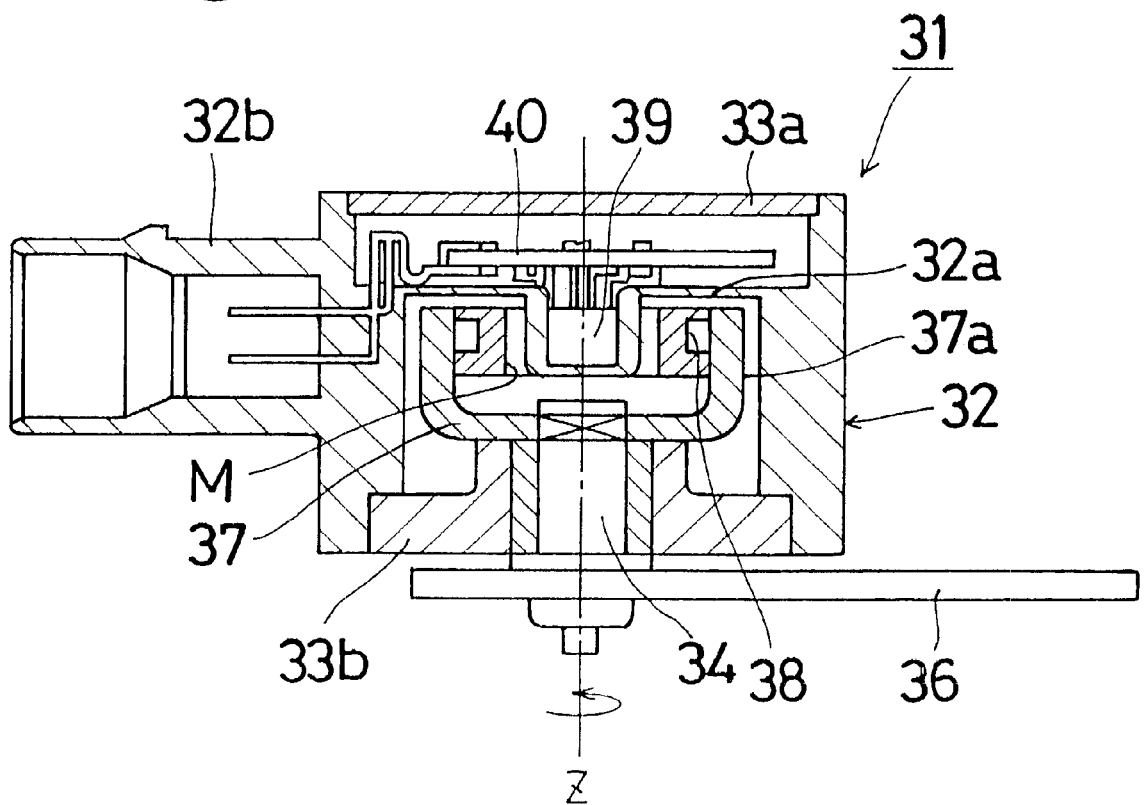
FIG. 11 is a cross sectional view of the rotational angle displacement sensor of the third embodiment.
Figure 12:
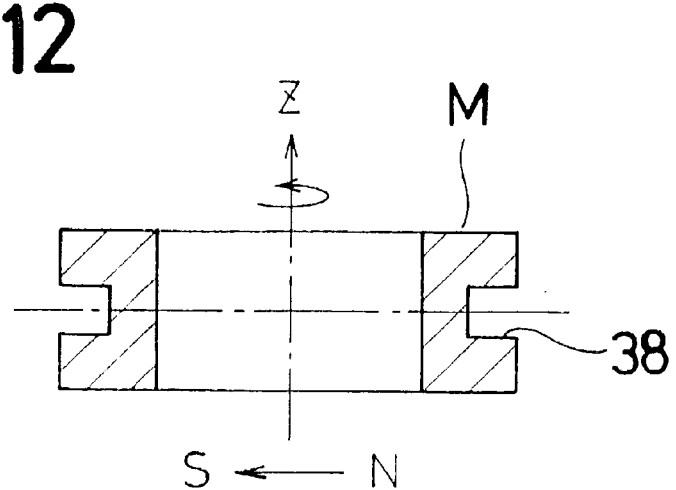
FIG. 12 is a cross sectional view of the cylindrical permanent magnet in the third embodiment.

Next, a third embodiment which concretizes the present invention will be described with reference to FIGS. 11 and 12. FIG. 11 shows a cross sectional view of a rotational angle displacement sensor 31 which converts the change of the vehicular height to the change of the rotational angle and which detects the vehicular height. In FIG. 11, a cylindrical case body 32 includes a partition portion 32a. The upper portion of the case body 32 is opened and the lower portion of the case body 32 is opened. The upper opening portion is closed by a cover member 33a and the lower opening portion is closed by a bearing member 33b. At the left side of the case body 32, a connector portion 32b is formed.

In the case body 32, a rotational axis portion 34 as a rotational member is rotatably supported on the bearing member 33b. The lower end of the rotational axis portion 34 is projected from the case body 32 and a base portion of a rotational lever 36 is fixed to the lower end of the rotational axis portion 34. A top end portion of the rotational lever 36 is connected to a lower arm of a suspension via a link mechanism (not shown). Accordingly, the rotational axis portion 34 is rotated in response to the change of the vehicular height.

At a top end portion of the rotational axis portion 34, a cylindrical yoke 37 having a bottom portion is fixed thereto. The yoke 37 is made of magnetic material and a central axis line of a cylindrical portion 37a of the yoke 37 is coincided with a axial center (Z axis) of the rotational axis portion 34. The cylindrical portion 37a rotates around the central axis line (Z axis) with the rotational axis portion 34 in a body.

A cylindrical permanent magnet M is fixed on an inner side surface of the cylindrical portion 37a. A central axis line of the permanent magnet M is coincided with the axial center (Z axis) of the rotational axis portion 34. Accordingly, the permanent magnet M rotates around central axis line (Z axis) with the rotational axis portion 34 in a body. The permanent magnet M is magnetized in the same way as the prior permanent magnet 54 shown in FIGS. 21 and 22. On an outer circumferential surface of the permanent magnet M, a circular groove 38 is formed as a magnetic flux density distribution correction portion.

At the center portion of the partition portion 32a, a concave portion which projected toward the inside of the cylindrical portion 37a and which is opened upward is formed. A Hall element 39 is disposed in the concave portion as a magnetoelectric conversion element. A center of the Hall element 39 is coincided with the central axis line (Z axis) of the permanent magnet M. Over the partition member 32a, a circuit board 40 is disposed and the Hall element 39 is electrically connected to a detection circuit element mounted on the circuit board 40.

When the permanent magnet M rotates around the central axis line (Z axis), the relative position between the permanent magnet (N, S poles) and Hall element 39. The Hall element 39 detects this change of the relative position (the change of the direction of the magnetic flux). The Hall element 39 outputs a detect signal corresponding to the variation of the relative position, namely the rotational angle.

According to the third embodiment, the following effects are obtained.

(1) In this embodiment, the circular groove 38 is formed on the outer circumferential surface of the cylindrical permanent magnet M which is fixed to the inner side surface of the cylindrical portion 37a. Accordingly, it is able to uniform the magnetic flux density distribution on the Z axis line in the cylindrical portion of the permanent magnet M in which the Hall element 39 is disposed by the circular groove 38. As a result, even if the manufacturing error in the Z axis direction with respect to the Hall element 39, it is able to reduce the detection error of the Hall element 39.

In this embodiment, the circular groove 38 is formed on the outer circumferential surface of the cylindrical permanent magnet M. Accordingly, it is able to die-cut easily when the permanent magnet M is formed. Therefore, the manufacturing becomes easily and the manufacturing cost can be reduced.

The embodiment of the present invention can be modified as follows.

In the first and second embodiments, the form of the permanent magnet is rectangular prism. However, it is possible to use a permanent magnet whose form is cube.

It is possible to change the width, thickness and height of the permanent magnet. It is able to form the magnetic flux density distribution correction portion of the third embodiment on the permanent magnet of the first and second embodiments.

Figure 13:
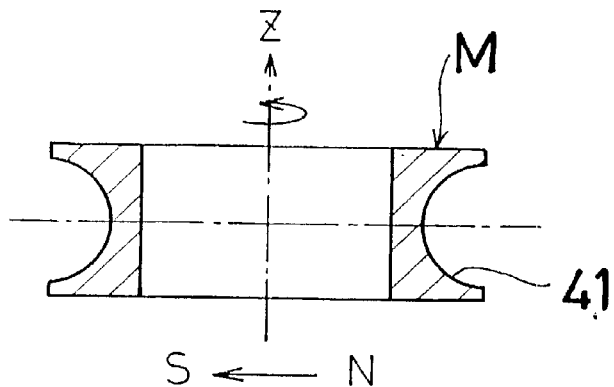
FIG. 13 is a cross sectional view of the modification of the cylindrical permanent magnet.
Figure 14:
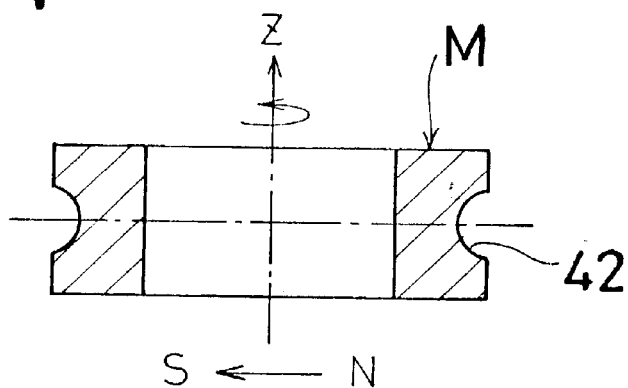
FIG. 14 is a cross sectional view of the modification of the cylindrical permanent magnet.

In the above mentioned embodiments, the cross sectional shape of the groove 38 is a rectangular shape. However, it is able to form the circular groove 41 whose cross sectional shape is half circle as shown in FIG. 13. Of course, it is able to the cylindrical magnet M on which the circular groove 42 is formed.

Figure 15:
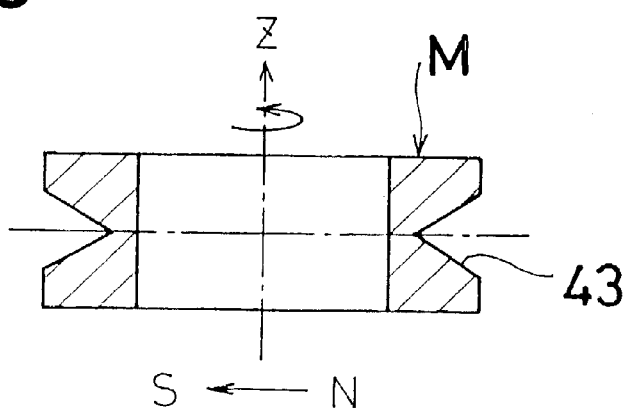
FIG. 15 is a cross sectional view of the modification of the cylindrical permanent magnet.

Further, as shown in FIG. 15, it is able to use the permanent magnet M which the circular groove 43 having V cross section is formed on the outer circumferential surface. In this case, it is able to change the inclined angle of V cross section of the groove 43. Thereby, the magnetic flux density distribution on the Z axis can be adjusted to uniform.

Figure 16:
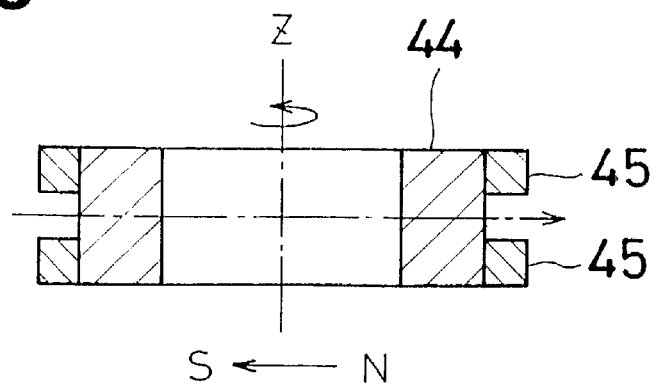
FIG. 16 is a cross sectional view of the modification of the cylindrical permanent magnet.
Figure 17:
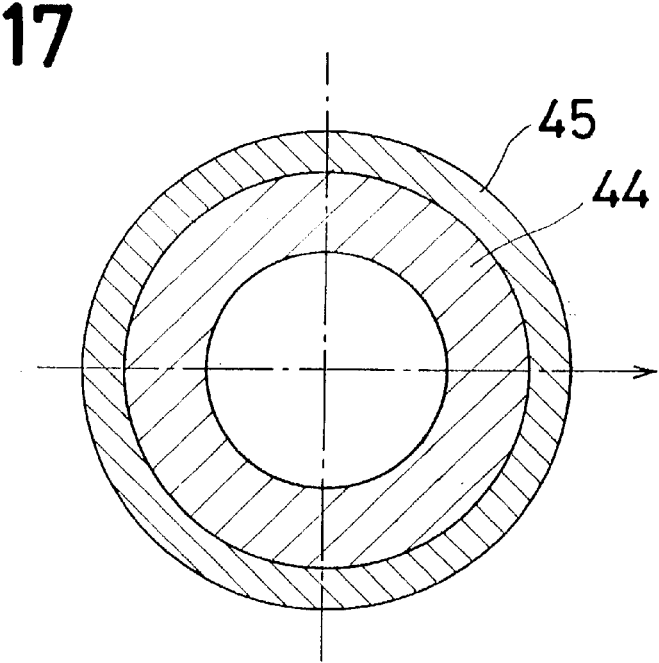
FIG. 17 a cross sectional view of the cylindrical permanent magnet in the third embodiment.
Figure 18:
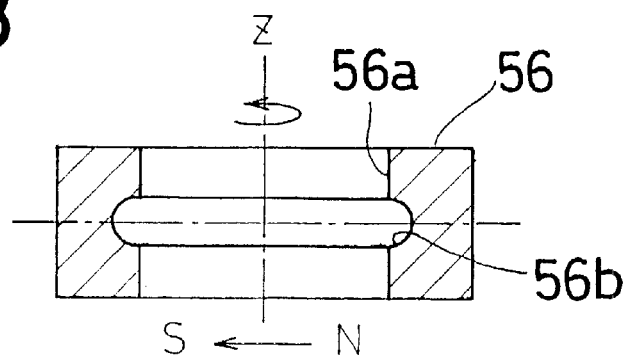
FIG. 18 is a cross sectional view of the prior cylindrical permanent magnet structure.
Figure 19:
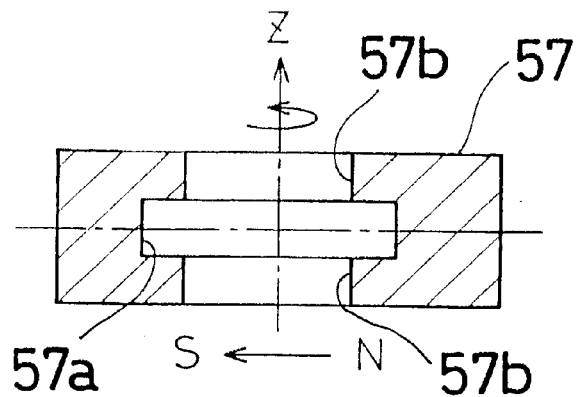
FIG. 19 is a cross sectional view of the prior cylindrical permanent magnet structure.
Figure 20:
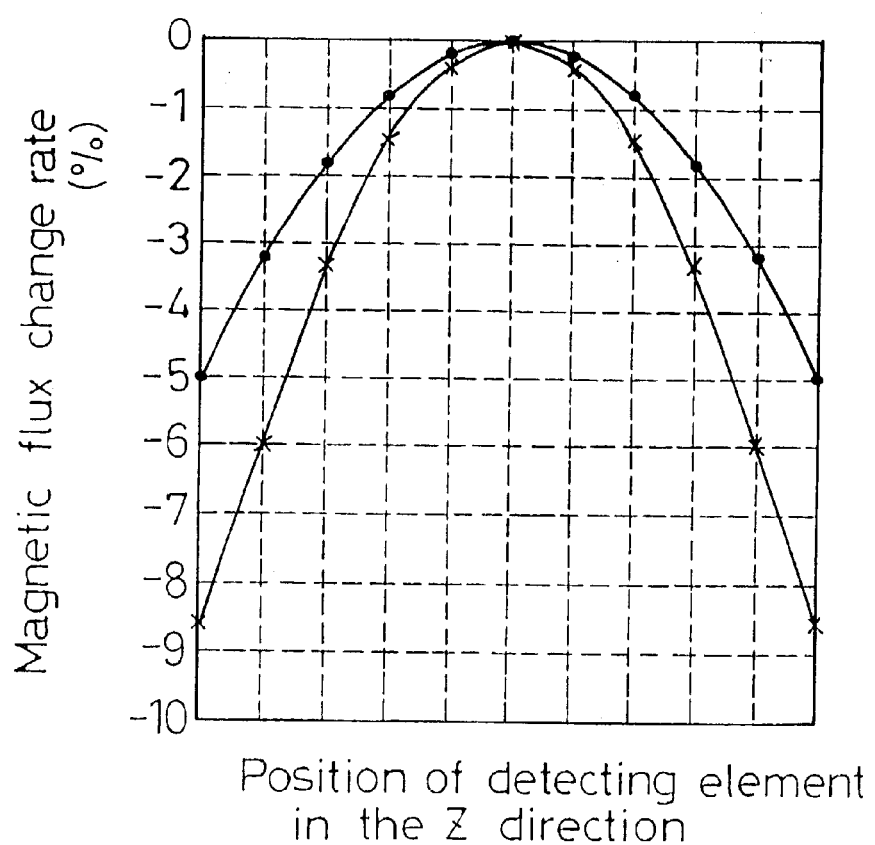
FIG. 20 is a graph showing characteristic courve of the magnetic flux density distribution on the Z axis of the cylindrical permanent magnet.

Further, as shown in FIGS. 16 and 17, it is able to fix the cylindrical yoke 45 made of magnetic material as the magnetic flux density distribution correction portion to both side portion of the cylindrical permanent magnet 44. In this case, it is able to uniform the magnetic flux.

Figure 21:
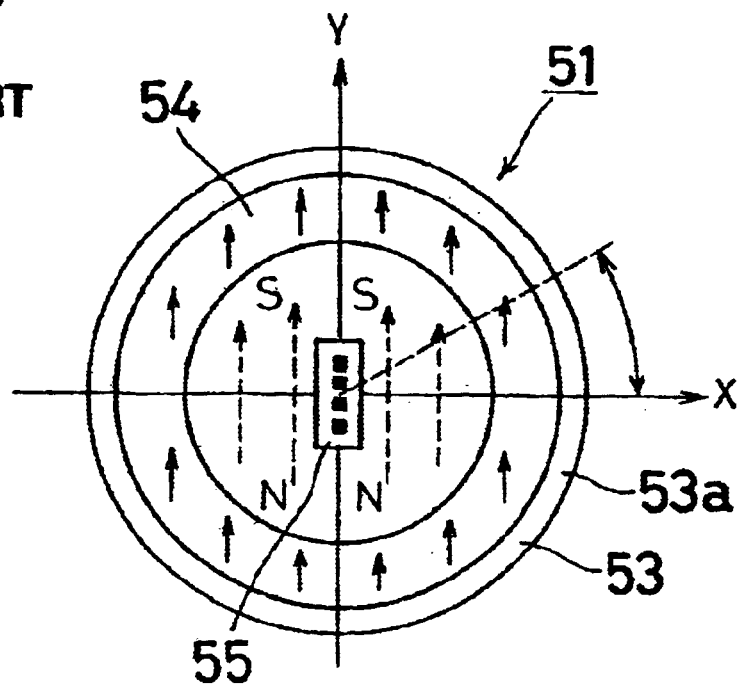
FIG. 21 is a plan view of the prior rotational angle displacement sensor.
Figure 22:
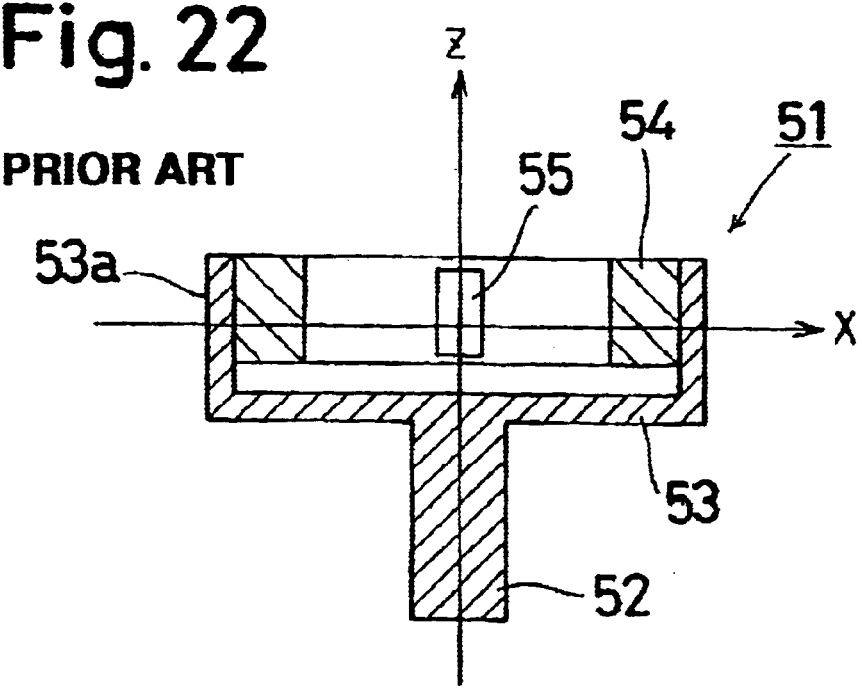
FIG. 22 is a cross sectional view of the prior rotational angle displacement sensor.

A graph showing characteristics courve of the magnetic flux density distribution on the Z axis of the cylindrical permanent magnet.
[FIG. 21]
A plan view of the prior rotational angle displacement sensor.
[FIG. 22]
A cross sectional view of the prior rotational angle displacement sensor.
[Explanation of Reference Characters]
11, 21, 31 . . . rotational angle displacement sensor as angle sensor
12 . . . rotational axis portion as a rotational member
13, 37 . . . yoke
13a . . . tubular portion
15a, 15b . . . flat wall portion
16, 39, 55 . . . Hall element as a magnetoelectric conversion element
34 . . . rotational axis portion as a rotational member
38 . . . groove as a magnetic flux density distribution correction portion
41, 42, 43 . . . circular groove as a magnetic flux density distribution correction portion
45 . . . yoke as a magnetic flux density distribution correction portion
53a . . . cylindrical portion
M1a, M1b, M2a, M2b, M11a, M11b, M12a, M12b, M . . . permanent magnet
What is claimed is:

1. An angle sensor comprising: a tubular yoke fixed to a rotational member; magnets fixed to an inner side surface of the tubular yoke and rotating around a rotational central axis of the rotational member; and a magnetoelectric conversion element disposed in magnetic field generated by the magnet and outputting an electric signal corresponding to the magnetic field; wherein the magnets include four pieces of magnets, two pieces of the magnets "forming a magnetic pole of a first polarity on one side of the tubular yoke and two other pieces of the magnets forming a magnetic pole of opposite polarity on the other side of the tubular yoke" and wherein the magnets forming the magnetic pole of one side and the magnets forming the magnetic pole of the other side are separated from each other and are fixed to the inner side surface of the tubular yoke.

* * * * *